United States Patent [19]

Carpenter

[11] 4,181,215
[45] Jan. 1, 1980

[54] GRAVITY TYPE CARRIER MECHANISM

[75] Inventor: William T. Carpenter, Churchville, Pa.

[73] Assignee: National Drying Machinery Co., Philadelphia, Pa.

[21] Appl. No.: 833,159

[22] Filed: Sep. 14, 1977

[51] Int. Cl.² .............................................. B65G 47/34
[52] U.S. Cl. ................................ 198/483; 198/706; 198/796; 99/443 C
[58] Field of Search ............... 198/377, 482, 483, 645, 198/646, 706, 796, 797, 799, 802, 402–404; 99/443 C; 134/46, 48, 52, 62, 70, 71, 134; 432/124, 230, 141, 144

[56] References Cited

U.S. PATENT DOCUMENTS

| 725,573 | 4/1903 | LeGrand | 198/706 |
|---|---|---|---|
| 3,804,583 | 4/1974 | Parkes | 432/230 |
| 3,857,477 | 12/1974 | Chipchase | 198/483 |
| 3,941,232 | 3/1976 | Parkes | 198/402 |
| 3,944,056 | 3/1976 | Feehery | 198/706 |

FOREIGN PATENT DOCUMENTS

162067  4/1964  U.S.S.R. .................. 99/443 C

Primary Examiner—Joseph E. Valenza
Attorney, Agent, or Firm—Weiser, Stapler & Spivak

[57] ABSTRACT

Gravity type carrier mechanism for baking pans and the like comprising a chain conveyor system and stationary and rotary cams suitable to produce one hundred and eighty degree pan turnover. The pans comprise individual gravity suspension systems wherein pan suspension pins are arranged to travel within vertically oriented slots in the pans whereby the center of gravity of each pan is automatically varied during turnover by interaction of the stationary and rotary cams upon the pins as the conveyor transports the pans.

30 Claims, 11 Drawing Figures

GRAVITY TYPE CARRIER MECHANISM

BACKGROUND OF THE INVENTION

The present invention relates generally to improvements in pans or trays, and more particularly is directed to gravity type carrier mechanisms comprising improved pan turnover features.

In U.S. Pat. No. 3,804,583, entitled "Baking Oven," which is owned by the assignee of the present application, there was disclosed an automatic oven and proofer which incorporated a conveyor system and a plurality of baking trays. The trays or pans were directed in a serpentine path through the apparatus by means of a continuous conveying system in an automatic manner. In the proofing, baking, depanning and cleaning operations which are performed automatically in the baking oven apparatus, there was a need to individually rotate each baking pan through one hundred and eighty degrees in at least five separate locations within the system. It has been found that the baking oven disclosed in U.S. Pat. No. 3,804,583 is highly efficient in operation and functions well to automatically and rapidly bake and deliver quantities of individual baked products such as biscuits, cupcakes and the like. However, certain operating difficulties have been noted and the present application seeks to overcome the problems being experienced and to provide an improved, trouble-free baking pan turnover apparatus.

In the turnover system of the baking oven apparatus disclosed in U.S. Pat. No. 3,804,583, pan turnover was accomplished by end positioned pins which projected from the heads of the pans and which turned through guides positioned at various locations within the apparatus to rotate the trays through one hundred and eighty degrees at tray turnover stations located both within and without the apparatus. Experience has proven that on occasion, the pins could miss the guides or could otherwise become ineffective to thereby require a period of down time in order to properly arrange, align or repair the parts. In other occurrences, the interaction of the pins and the guides tended to torsionally twist certain of the baking trays to thereby bend the baking trays from the desired rectangular cross sectional configuration. It has also been found that extensive guidance systems were required throughout the apparatus in order to maintain the level orientation of the trays, all of which added to the overall cost of the baking ovens.

The baking pans of the present invention can be of desired cross-sectional configuration having dimensions limited only by the shape of the product being baked and by the space limitations imposed by the conveyor construction. In previous embodiments, it was necessary to construct each baking tray to substantially a square cross-sectional configuration. Such square configuration created problems in tray-to-tray clearance as the pans were rotated through one hundred and eighty degrees about the turnover sprockets. The construction limited the height of the product that could be baked and thereby limited the versatility of the oven system itself. Additionally, the prior art baking pans had shaft clearance problems which, when combined with the tray clearance problems resulted in limiting the baked product to cakes or similar baked goods of only approximately one and one-half inches in height. In the present apparatus, the baked product can be as much as approximately three and three-quarters inches in height.

Prior workers in the art have long sought suitable, rugged, reliable methods of turning over buckets or other containers as they were transported by a conveyor mechanism. The devices disclosed in U.S. Pat. Nos. 725,573, 3,312,333, 3,857,477, 486,809, 1,636,220, 3,944,056, 3,044,602 and 1,252,613 are exemplary of prior art types of conveyor systems including container turnover mechanisms. U.S. Pat. No. 725,573 is of special interest in the disclosure of means which have been provided during passage around the sprocket wheels for compelling gradual gravitation of trunnions from the outer end of links to the lower end of the links as each bucket passes from a curve to a horizontal conveyor run.

In U.S. Pat. No. 3,857,477, there is disclosed a tray turnover device for baked products comprising an elongated tube which is retained between wheeled members in centered position below the trays to serve as the counterweight and to maintain the tray in upright position. An electric motor is provided to drive a disc which is maintained in a downwardly biased position by a spring. A rotatable engagement of the disc with each wheel member of the tray trunover devices occurs and a chain guide carries a holding track including an elongated slot. The holding track is positioned for slidable engagement with a land when the tray turnover device is inverted to the discharge position.

The prior art tray turnover devices are all cumbersome in operation, ungainly in construction and expensive in fabrication.

SUMMARY OF THE INVENTION

The present invention relates generally to the field of conveyors and more particularly is directed to conveyor systems comprising a plurality of rotatable trays or pans and cam means to rotate the pans through one hundred and eighty degrees in an automatic manner.

The present invention comprises both stationary cams and rotary cams which function in conjunction with gravity suspension pins which are carried by each pan or tray. The suspension pins project transversely outwardly through elongated slots which are provided in the heads of each pan. During interaction of the pins with the cams, the pins ride in paths between the tops and bottoms of the slots. The movement of the gravity suspension pins within the respective slots causes the center of gravity of each tray or pan to be varied as the pins contact the stationary and rotary cams in a manner to aid in the one hundred and eighty degree turnover.

In an examplary construction, in a horizontal portion of the converyor run, one or more stationary cam stations, each in the form of an inclined plane is provided in fixed relationship with the baking oven installation. Interaction of the gravity suspension pins and the simple inclined plane at each stationary cam station takes place within a linear distance of approximately twelve inches for tray turnover purposes. In one embodiment, the cam is inclined at an angle of approximately fifteen degrees so that the pins of each tray travel within their respective slots the full vertical distance, for example, one and one-half inches, whereby tray turnover is automatically accomplished as the shift in center of gravity causes tray unbalance or instability about the pins.

As the oven conveyor carries the rotatable baking trays through the various operations such as proofing, baking, depanning and washing, strategically positioned stationary cams in the case of horizontal conveyor runs and rotary cams in the case of ninety degree turns in the conveyor runs, are employed for baking tray turnover purposes. The trays include gravity suspension pins which ride upwardly in vertical slots as the pins contact the cams whereby the center of gravity of each tray can be elevated to an overbalance condition at the cams to aid in the tray turnover procedure.

The turnover arrangement of the present invention operates automatically, inexpensively and with extremely little maintenance.

It is therefore an object of the invention to provide an improved gravity type carrier mechanism for pans and trays.

It is another object of the present invention to provide a novel, gravity type carrier mechanism including pan suspension pins which are free to ride within vertical slots as the pans are rotated by strategically positioned cams.

It is another object of the present invention to provide a novel gravity type carrier mechanism for pans including both stationary cams and rotary cams which function with movable pan suspension pins to alter the center of gravity of each pan to thereby automatically rotate the pans through one hundred and eighty degrees at specified locations.

It is another object of the present invention to provide a gravity type carrier mechanism for pans and trays comprising baking trays including movable pin means, stationary cams contacted by the movable pin means for tray turnover purposes and rotary cams contacted by the movable pin means for tray turnover purposes.

It is another object of the present invention to provide a novel gravity type carrier mechanism comprising a conveyor system, means to suspend and transport a plurality of pans and means to automatically change the location of the center of gravity for each pan to aid in rotating each pan through one hundred and eighty degrees at specified locations along the conveyor system.

It is another object of the present invention to provide a novel gravity type carrier mechanism for pans that is simple in design, inexpensive in construction and trouble free when in operation.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
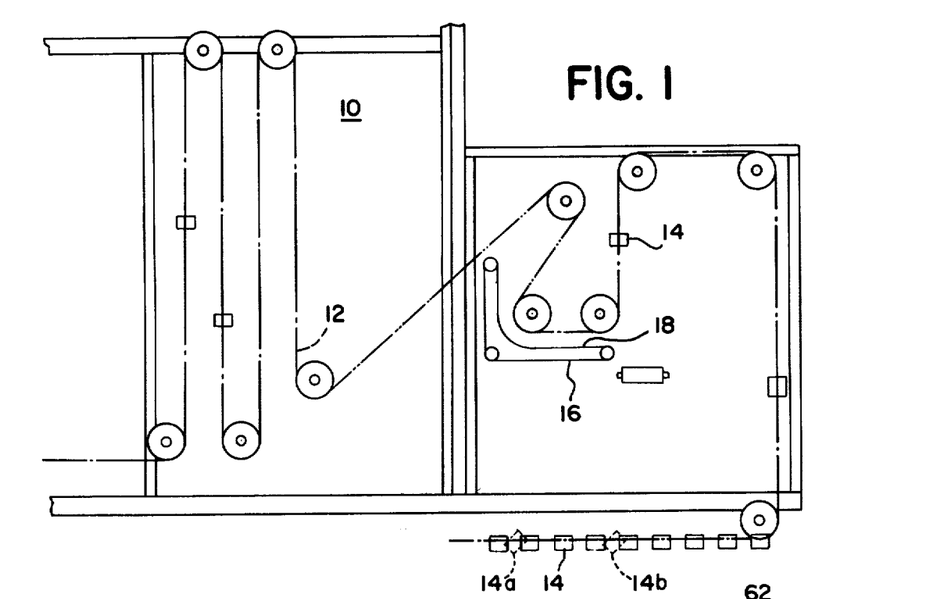
FIG. 1 is a schematic view showing the stationary and rotary cam pan turnover devices installed in an automatic, conveyor equipped, baking oven construction.

Referring now to the drawings, there is shown schematically a baking oven system generally designated 10 comprising a chain conveyor 12 and a plurality of baking trays or pans 14 which are transported through the apparatus in suspended, spaced relationship. As stated in U.S. Pat. No. 3,941,232, entitled "Curved Path Delivery System," which patent is assigned to the same assignee as the present application, it is demonstrated that it is necessary to turn over the baking pans 14 through one hundred and eighty degrees after completion of the baking process to depan the fully baked product (not shown in the present application) upon the slack belt conveyor system 16. The present invention includes, in one embodiment, an improved baking pan turnover mechanism in the configuration of a first cam means which is positioned in spaced relationship from the slack side of the depanning belt 18 wherein the conveyor turns through ninety degrees. The construction of the rotary cam tray turnover means 90 at the depanning belt 18 will hereinafter be more fully discussed when considering the construction details of FIG. 8. In FIG. 9, as hereinafter more fully discussed in detail, there is disclosed a second cam means in the configuration of a stationary cam means 120. The stationary cam means is provided to turn the baking pans 14 through one hundred and eighty degrees in a horizontal run of the conveyor system 12 when required, for example, in the baking pan rinsing and washing chambers which are schematically indicated at 14a and 14b in FIG. 1.

Figure 2:
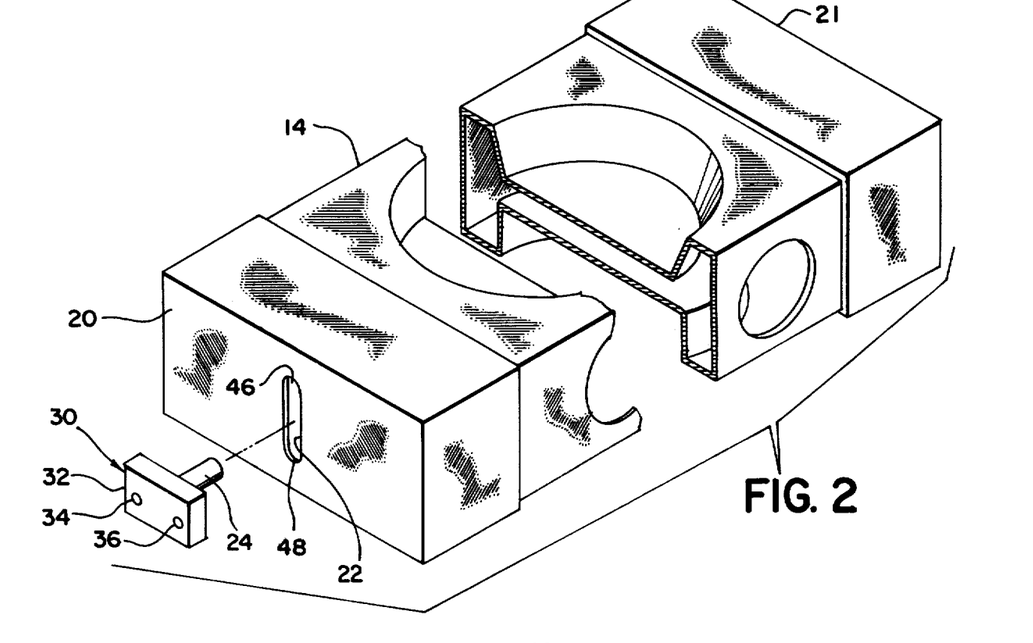
FIG. 2 is a perspective view of a baking pan having an elongated, vertical slot in each head.
Figure 5:
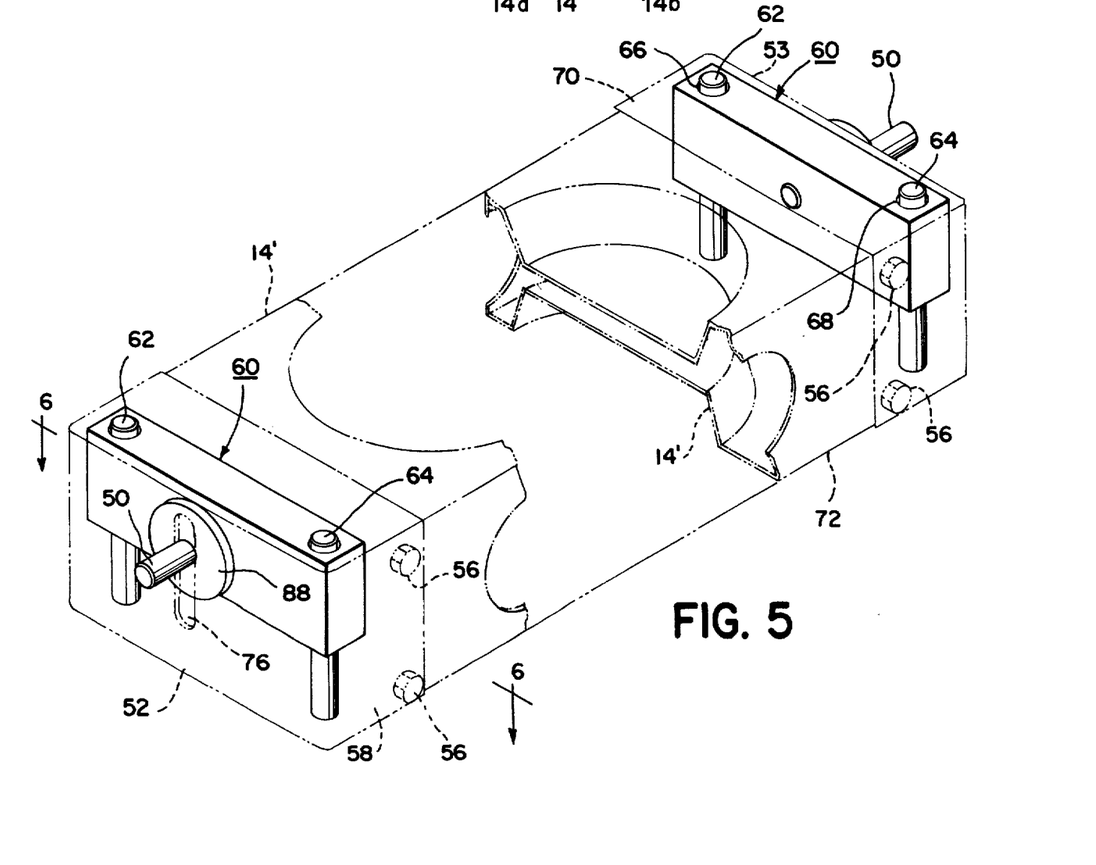
FIG. 5 is a perspective view of a modified baking pan or tray incorporating modified gravity suspension pin construction.

The baking pan turnover mechanism of the present invention comprises a gravity suspension system for each try or pan 14, 14' wherein a pair of opposed gravity suspension pins 24 or 50 project laterally outwardly from each head 20, 21, 52, 53 of each baking pan 14, 14' for pivotally suspending each baking pan from the baking oven chain conveyor 12. Slot means are provided at each head 20, 21, 52, 53 of each baking pan 14, 14' to permit vertical movement of the pin 24, 50 relative to the baking pan. As best seen in FIGS. 2 and 5, the slot means preferably comprise a vertical, elongated slot 22, 76 within which the pin 24 or 50 freely rides throughout its vertical path of travel relative to the baking tray 14, 14' during the tray turnover procedure. The movement of the pivot pin 24 or 50 within the slot 22 or 76 at each head 20, 21, or 52, 53 raises and lowers the center of gravity of the baking pan 14 or 14' to facilitate baking pan turnover utilizing either the stationary tray turnover means 120 of FIG. 9 or the rotary cam turnover means 90 of FIG. 8 in the manner hereinafter more fully discussed.

In the embodiment illustrated in FIG. 2, each baking pan head 20, 21 is equipped with a vertically oriented, axially positioned, elongated slot 22 which extends substantially the entire height of the baking tray or pan 14 to permit full vertical movement of the pivot pins 24 within the slots 22 as the baking tray 14 is turned over through one hundred and eighty degrees for baked product depanning, washing, rinsing or other operations attendant to the automatic production of rolls, cakes and other baked goods.

Figure 3:
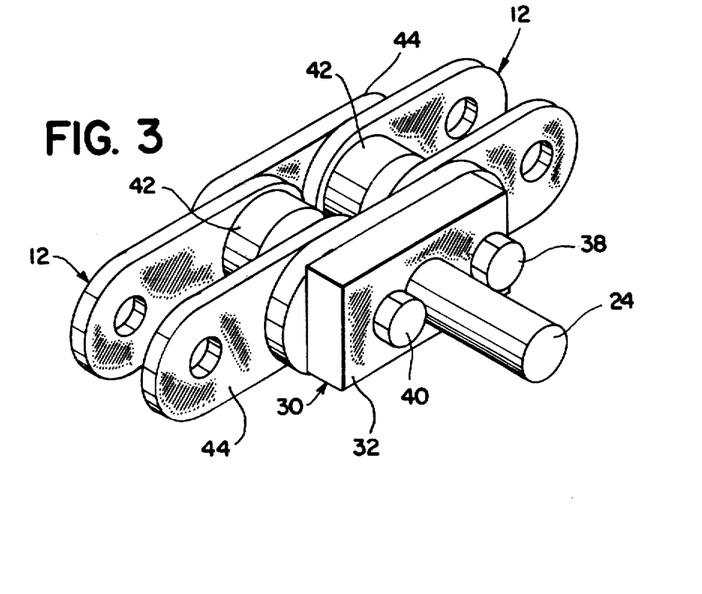
FIG. 3 is a perspective view of one embodiment of a gravity suspension pin affixed to a portion of a chain conveyor through a chain attachment block.
Figure 4:
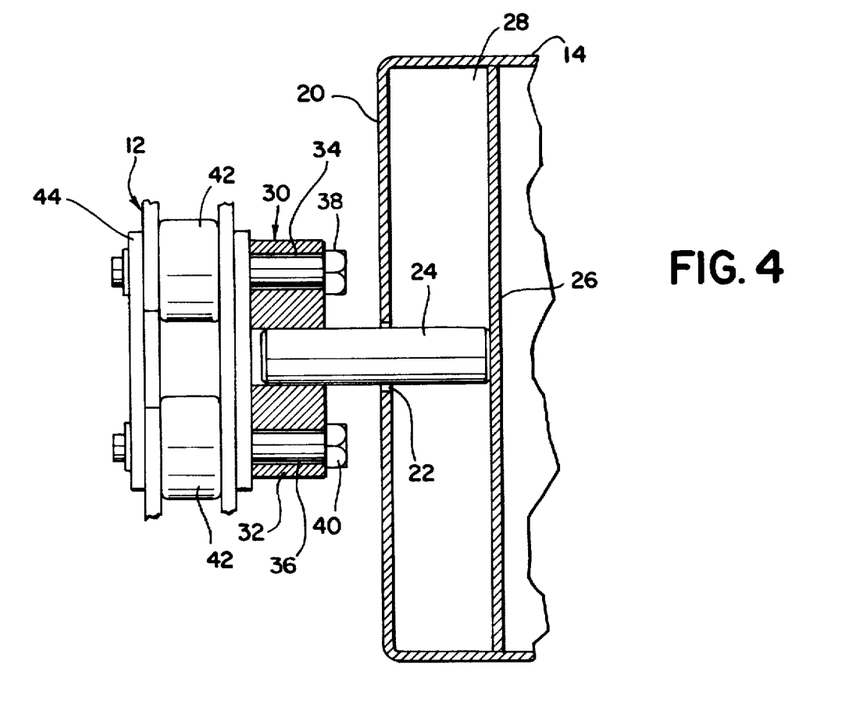
FIG. 4 is a top plan view, partially broken away, showing one end of a baking pan suspended by the gravity suspension pin of FIG. 3.

Referring now to FIGS. 2, 3, 4, there is illustrated one system of suspending the baking trays or pans 14 from the oven chain conveyor 12 which comprises affixing a closed head 20, 21 at the respective lateral ends of the trays 14. Each head 20, 21 is fabricated substantially planar in configuration and is vertically oriented to maintain a clearance or spaced relationship between the ends of the baking pans 14 and the chain conveyor 12. Each head 20, 21 is machined or otherwise treated to provide a vertically oriented, elongated slot 22 which extends more than one-half the distance between the tray top and tray bottom and preferably extends substantially the entire height of the baking pan 14. For example, if the baking pans are fabricated to a height of approximately three and one-half inches, the effective length of the slots 22 preferably will be approximately three inches, thereby to provide a full range of travel of the pans 14 relative to the pivot pins 24 as the baking pans are rotated through one hundred and eighty degrees at specified locations within the baking oven system 10 in the manner hereinafter more fully set forth. Preferably, the heads 20, 21 are inwardly closed by respective walls 26 which are spaced inwardly from the heads 20, 21 a sufficient distance to receive the pivot pins 24 within the space 28 defined between the outer face plates of respective heads and the enclosing walls 26. The walls 26 serve to protect the vertical slots 22 from clogging or fouling by preventing the introduction of dough, oil, grease or other extraneous matter which may have a tendency to interfere with the relatively free movement of the pivot pins 24 within the slots 22.

For suspension of the baking trays 14, a chain attachment block 30 is connected to the conveyor chain 12 in alignment with each end of the baking pans 14. The chain attachment blocks each comprise a base 32 having a pivot pin 24 secured therein in a manner to extend transversely inwardly therefrom to enter the slots 22 for supporting the baking pans 14. The chain attachment block base 32 is provided with a pair of spaced openings 34, 36 which are co-planar with the pivot pin 24 and which are spaced apart a distance equal to the spacing between the centers of adjacent rollers 42 of the chain conveyor system 12. Conventional bolts or other fasteners 38, 40 insert through the base holes or openings 34, 36 to securely affix the chain attachment blocks 30 to the chain conveyor 12 at the connecting links 44 thereof. The pivot pins 24 are secured to the chain conveyor 12 in predetermined spaced locations to suspend each baking pan 14 in a gravity suspension from the chain conveyor system 12, in a manner to allow limited vertical movement of the pans relative to the conveyor as the pins 24 ride within the slots 22. The width of each slot 22 is fabricated slightly larger than the diameter of a pivot pin 24 to allow free, sliding engagement of the pin 24 relative to the slot 22 as the baking pans 14 are rotated through one hundred and eighty degrees. The upper and lower ends 46, 48 of the elongated slots 22 are preferably drilled or otherwise machined to a semi-circular configuration of diameter slightly larger than the diameter of the pivot pin 24 to act both as a bearing and to facilitate level orientation of the baking trays 14 during their path of travel through the baking oven system 10.

Figure 6:
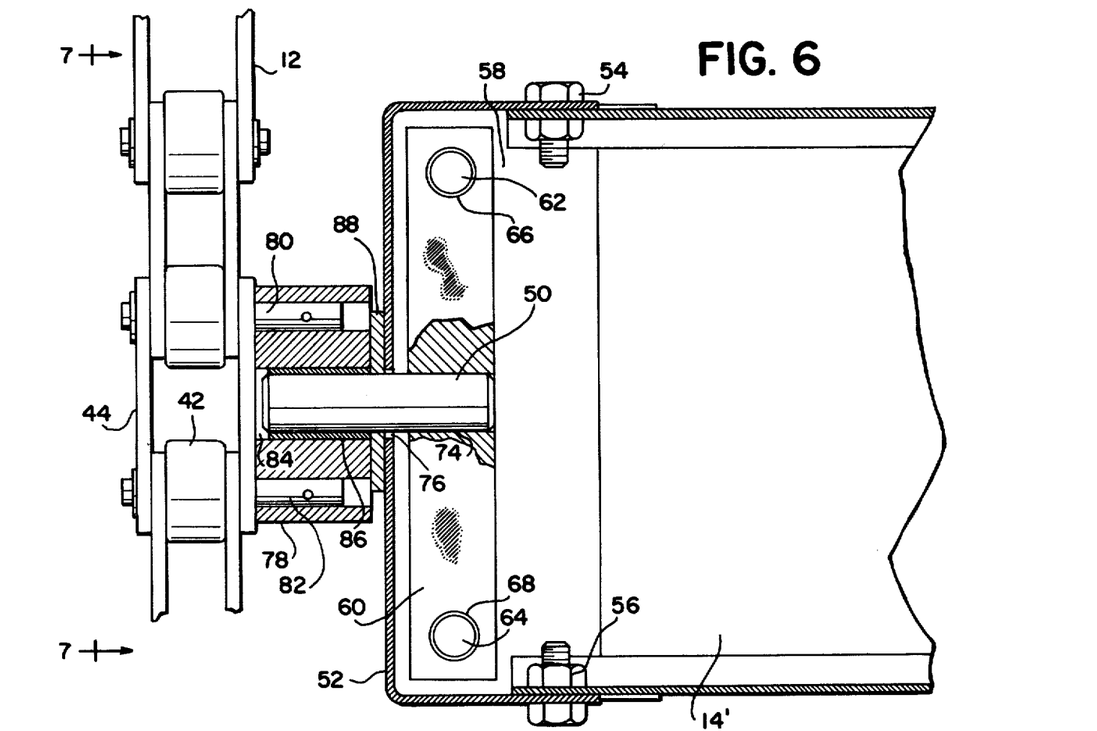
FIG. 6 is a top plan view showing the baking pan of FIG. 5 carried by a chain conveyor at the gravity suspension pin.
Figure 7:
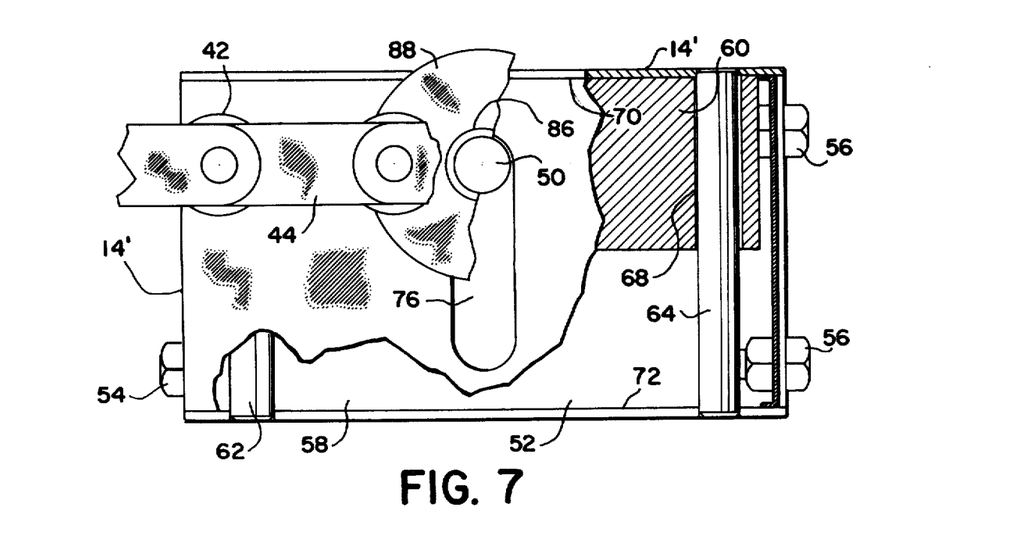
FIG. 7 is an end elevational view looking in the direction of the arrows from line 7-7 of FIG. 6, and partly broken away.

Referring now to FIGS. 5, 6 and 7, there is illustrated a modified arrangement for suspending the modified baking pans 14' from the chain conveyor 12 wherein each pivot pin 50 is carried by the baking tray 14' at the heads 52, 53 for tray suspension purposes. As illustrated, each lateral end of the modified baking pan 14' is equipped with a modified head 52, 53 which can be secured to the tray construction by conventional fasteners 54, 56. The respective heads 52, 53 define interior chambers 58 within which a pivot pin guide slide block 60 is vertically movable. A pair of spaced, vertical guide rods 62, 64 are positioned within each chamber 58 to receive thereon a slide block 60 in sliding engagement. As illustrated, the slide blocks 60 are drilled or otherwise machined to provide a pair of spaced openings 66, 68 of size to overfit and slide upon the guide rods 62, 64 in easy, sliding engagement. As each baking tray 14' is transported by the conveyor 12, the side block 60 will ride upwardly along the guide rods 62, 64 and normally will position against the tray top construction 70 to maintain a gravity suspension of the trays 14'.

When the baking pans or trays 14' are rotated through one hundred and eighty degrees as hereinafter more fully set forth the slide blocks 60 will be urged downwardly along the guide rods 62, 64 towards the tray bottom upon function of the rotary tray turnover means 90 or the stationary tray turnover means 120 and will stop against the opposite tray wall, which wall will then become the tray top when the tray is fully rotated. It is noteworthy that the pivot pin slide blocks 60 are fabricated to a height that is approximately one-half of the height of a baking tray so that the length of travel of the guide slide 60 along the guide rods 62, 64 will be approximately one-half the height of the baking trays 14'. The vertical movement of the slide blocks 60 relative to the baking trays 14' serves to change the position of the center of gravity of the trays 14' during the one hundred and eighty degree turnover process.

A pivot pin 50 is a force fit within an opening 74 provided in each slide block 60 to provide a substantially unitary construction whereby each pin 50 moves vertically within its associated slot 76 relative to the baking tray 14 as the guide block itself moves vertically. As best seen in FIGS. 6 and 7, each baking tray head 52, 53 is machined or otherwise treated to provide an elongated slot 76 through which the pivot pins 50 transversely outwardly project. The slots 76 are fabricated with substantially parallel sidewalls that are spaced apart a sufficient distance to freely receive the pivot pin 50 therewithin a non-binding sliding engagement. A chain attachment block 78 is affixed to the chain conveyor 12 and includes suitable spring pins or other fasteners 80, 82 for affixing the chain connecting block 78 to the chain conveyor 12 at the interconnection of the chain links 44 and rollers 42 in a well known manner to provide a sturdy connection which is compatible with the conveyor operation. The chain connecting block 78 comprises a centrally positioned bore 84 within which is pressed a bushing 86 of suitable size to receive therein the outward extension of the pivot pin 50. A suitable spacer or washer 88 is interposed between the chain connecting block 78 and the baking pan heads 52, 53 to facilitate respectively rotative movement between the pivot pin 50 and the chain connecting block 78 and longitudinal movement of the pivot pin 50 within the slot 76.

Figure 8:
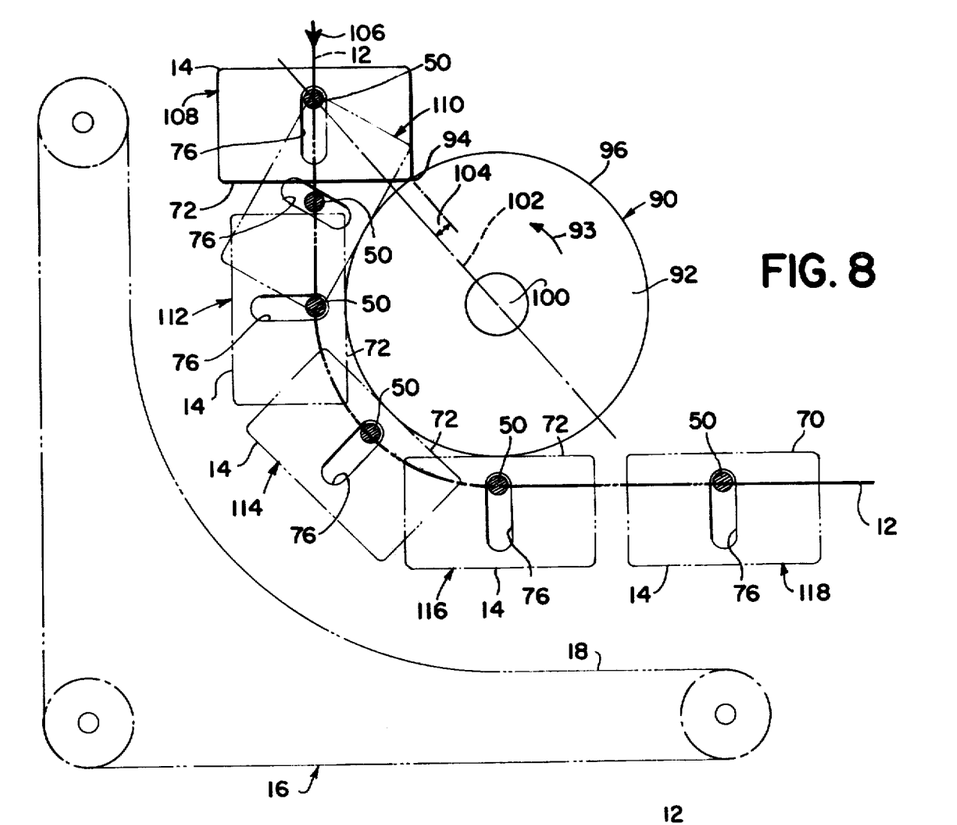
FIG. 8 is a detailed view showing the successive arrangement of parts as a baking pan is turned through one hundred and eighty degrees about a rotary cam.
Figure 9:
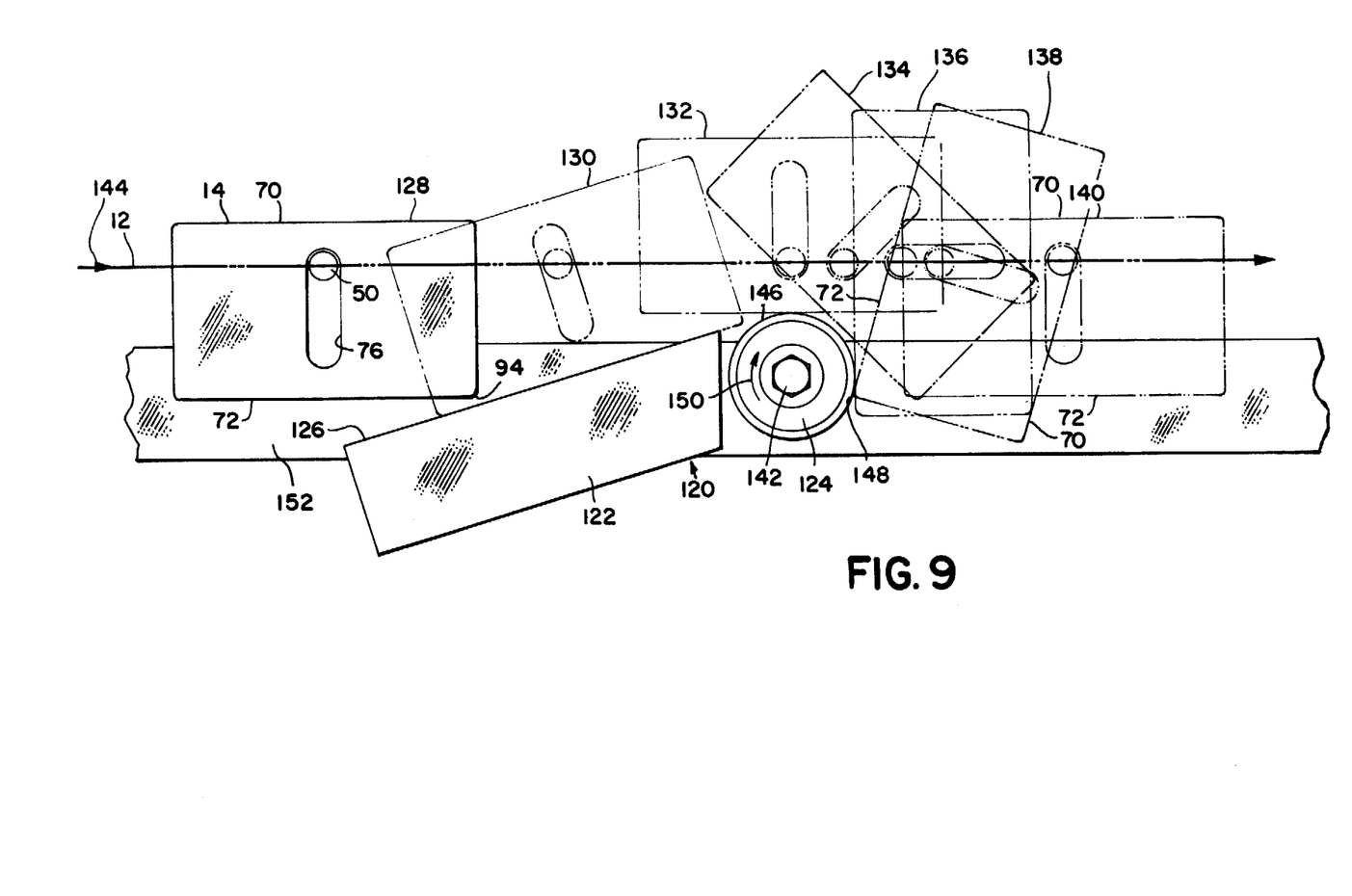
FIG. 9 is a detailed view showing the successive arrangement of parts as a baking pan is turned through one hundred and eighty degrees over a stationary cam.

Referring now to FIG. 8, there is illustrated a rotary tray turnover means 90 suitable for one hundred and eighty degree tray turnover at a location wherein the conveyor 12 turns through ninety degrees, for example, in proximity to the depanning belt 18. As schematically illustrated, the chain conveyor 12 carries each baking pan 14 or 14' toward the rotary cam 92. The cam 92 is preferably concentric with the center of radii defining the conveyor turn through ninety degrees. One corner 94 of each baking tray 14 contacts a portion of the outer periphery 96 of the rotary cam 92. It is noteworthy that the cam 92 is driven in the direction of the arrow 93 by the shaft 100 for tray turnover purposes. In a preferred embodiment, the peripheral speed of the rotary cam 92 equals the linear speed of the chain conveyor 12 to maintain contact of the cam periphery 96 with the bottom 72 of each baking pan 14, 14' as the baking pan moves about the rotary cam 92 for turnover purposes. In this manner, rubbing, wearing, chattering or other unwanted results of frictional, sliding engagement are minimized. It is noteworthy that the initial contact between the tray corner 94 and the cam periphery 96 occurs above an imaginary line 102 drawn between the center of the pivot pin 50 and the center of the cam shaft 100 as indicated by the double headed arrow 104. By assuring initial contact above the imaginary line 102, positive turnover of each baking tray 14, 14' can be assured in the desired rotational direction, for example, in a counterclockwise direction as illustrated in FIG. 8.

Still referring to FIG. 8, it will be noted that the action of the chain conveyor 12, when moving in the direction of the arrow 106, urges each tray bottom 72 into engagement with the outer periphery 96 of the rotary cam 92 by rotation of each baking pan 14, 14' about the pivot pin 50 following initial contact between the tray corner 94 and the cam periphery 96. The trays 14, 14' will be rotated in a counterclockwise direction as illustrated from the initial horizontal position illustrated at 108, through the angular position 110, to the full vertical position indicated at 112. The geometry of the system is designed to position portions of the chain conveyor 12 closest to the center of the cam shaft 100 through a ninety degree angle at the conveyor turn as defined between a respective horizontal plane and a vertical plane drawn through the cam shaft 100. As previously set forth, the pin 24, 50 is affixed directly or indirectly to the chain conveyor 12. Accordingly, the pin 24, 50 will also be located closest to the center of the shaft 100 in the turn area defined between the respective horizontal and vertical planes passing through the center of the shaft 100. As above set forth, the baking pans 14, 14' are free to move along the slots 22, 76 relative to the pins 24, 50 and accordingly, as the baking trays move through the positions indicated at 108, 110 and 112, the baking trays will move from a relative position wherein the pins 24, 50 are most remote from the tray bottoms 72 as in position 108 to the position wherein the pins 24, 50 are closest to the tray bottoms 72 as indicated in position 112. Movement of the relative position of the pins from bottom to top, will, of course, change the location of the tray center of gravity.

Continued movement of the chain conveyor 12 in the direction of the arrow 106 completes the one hundred and eighty degree rotation of the baking pans 14, 14' about the circular cam 92 by urging the pans through the angular position 114 to the full horizontal position illustrated at 116. It is noteworthy that the pin 24, 50 remains in position closest to the (former) tray bottom 72 in the angular position 114 and the full horizontal position 116 as illustrated. When the baking tray 14, 14' reaches the horizontal position 116, the chain conveyor 12 carries the baking tray away from contact with the outer periphery 96 of the rotary cam 92 whereby the position of the pin 24, 50 is at the (now) top of the slot 76. This results in stabilizing the baking tray 14, 14' in the horizontal position 116 inasmuch as the center of gravity of the baking tray is now well below the pivot pin 24, 50. Thus, when the chain conveyor 12 carries the baking tray 14, 14' away from the rotary tray turnover means 90, the tray will remain in the horizontal position 118 which is a full one hundred and eighty degree turnover from the position of the tray 14, 14' when in the initial horizontal positon 108. Inasmuch as the baking trays 14, 14' are fabricated generally symmetrically, when a tray 14, 14' is turned over through one hundred and eighty degrees from the position 108 to the position 118, the tray bottom 72, which is in contact with the rotary cam 92, can then be considered as the tray top 70, in the new orientation of position 118.

It is contemplated that the shaft 100 will rotate in synchronism with the speed of the conveyor 12 to thereby turn the rotary cam 92 at the same peripheral speed as the linear speed of the conveyor 12. Optionally, the rotary shaft 100 could be fixed and the rotary cam 92 could be provided with rotary movement relative thereto whereby the contact of the tray bottom 72 against the outer periphery 96 of the rotary cam 92 will cause the rotary cam to rotate at the same peripheral speed as the speed of the baking trays during all periods when a baking tray bottom 72 is in contact with the cam periphery 96.

Referring now to FIG. 9, a second one hundred and eighty degree tray turnover apparatus is illustrated for tray rotation in a horizontal run of the chain conveyor 12. A stationary tray turnover means 120 is employed in a manner whereby the parts are affixed to stationary portions of the oven system, such as a part of the supporting frame 152. A cam in the form of an inclined ramp 122 is affixed to the frame member 152 and has its cam surface or contact face 126 sloping downwardly in a direction opposite the direction of travel of the conveyor 12 as indicated by the arrow 144. The angle of inclination and length of the contact face 126 should be sufficient to raise each tray 14, 14' through a height equal to the height of the slot 76 (or 22), for example, approximately three inches in the embodiments illustrated.

Downstream of the inclined ramp 122 there is positioned a turnover wheel 124 which is rotative about its frame affixed shaft 142 in conventional manner. The turnover wheel is so positioned that a portion of its outer periphery 146 is tangential to a planar extension of the ramp contact face 126 whereby a bottom 72 of a tray 14, 14' will contact and turn about the turnover wheel 124 as each tray is urged upwardly and forwardly along the inclined ramp 122 by the chain conveyor system 12 as it moves in the direction of the arrow 144.

Still referring to FIG. 9, the operation of the stationary tray turnover means 120 will now be described. Each tray bottom 72 is urged into engagement with a portion of the ramp contact face 126 during the turnover process. As illustrated, the leading bottom corner 94 contacts the ramp face 126 in a manner to urge the tray to follow the inclined path defined by the contact face 126 as the tray is moved forwardly by the conveyor 12. It is noteworthy that the angle defined between the tray bottom 72 and the ramp face 126 is less than forty-five degrees at point of contact to thereby assure counterclockwise rotation of each tray 14, 14' about its respective pins 24 or 50.

Movement in direction of the arrow 144 urges each tray 14, 14' from the initial or lower horizontal position 128, through the angularly inclined position 130 to the upper horizontal position 132. In the upper horizontal position, the tray bottom 72 rests directly upon the outer periphery 146 of the turnover wheel 124. It will be noted that in the travel of each tray from the lower horizontal position 128 to the upper horizontal position 132, the trays are elevated by the ramp a distance substantially equal to the height of the slot 22 or 76. In the position 132, the pins 24, 50 are located at the respective bottoms of the slots to a location closest to the tray bottom, thereby raising the center of gravity of the trays with respect to the pins to an over balanced condition. As the baking trays are moved through the positions indicated at 128, 130, 132, the baking trays will move from a relative position wherein the pins 24, 50 are most remote from the tray bottoms 72 as in position 128 to the position wherein the pins 24, 50 are closest to the tray bottoms as indicated in position 132.

Continued movement of the chain conveyor 12 in the direction of the arrow 144 completes the one hundred and eighty degree rotation of the baking trays 14, 14' about the turnover wheel 124 by urging the trays or pans through the angular position 134 to the full vertical position 136. It is noteworthy that the pins 24, 50 remain in position closest to the (former) tray bottom 72 in the angular position 134 and the full vertical position 136 as illustrated. When the tray 14, 14' reaches the full vertical position 136, the chain conveyor 12 carries the baking tray downstream from the turnover means 120. The unbalanced condition of each tray causes automatically each tray to continue rotation about the pivot pins. In position 138, it will be observed that only the trailing corner 148 of the tray contacts the wheel periphery 146. When the conveyor carries each tray entirely clear of the wheel 124 the tray will return to a full horizontal (lower) position 140 that is similar to the position 128 with the exception that the tray has been rotated through one hundred and eighty degrees. The former tray bottom 72 which was in contact with the inclined face 126 and the wheel periphery 146 can be considered the tray top in the new orientation of the tray when moved to the position 140.

It is contemplated that the turnover wheel 124 may be either freely movable upon contact with the respective tray bottom 72 as the tray is drawn over the wheel 124 or optionally, the wheel shaft 142 can be powered to provide power rotation of the wheel 124 during the tray turnover process. Either power rotation or frictional rotation of the turnover wheel 124 causes the wheel to rotate in the direction of the arrow 150 during the turnover procedures.

Figure 10:
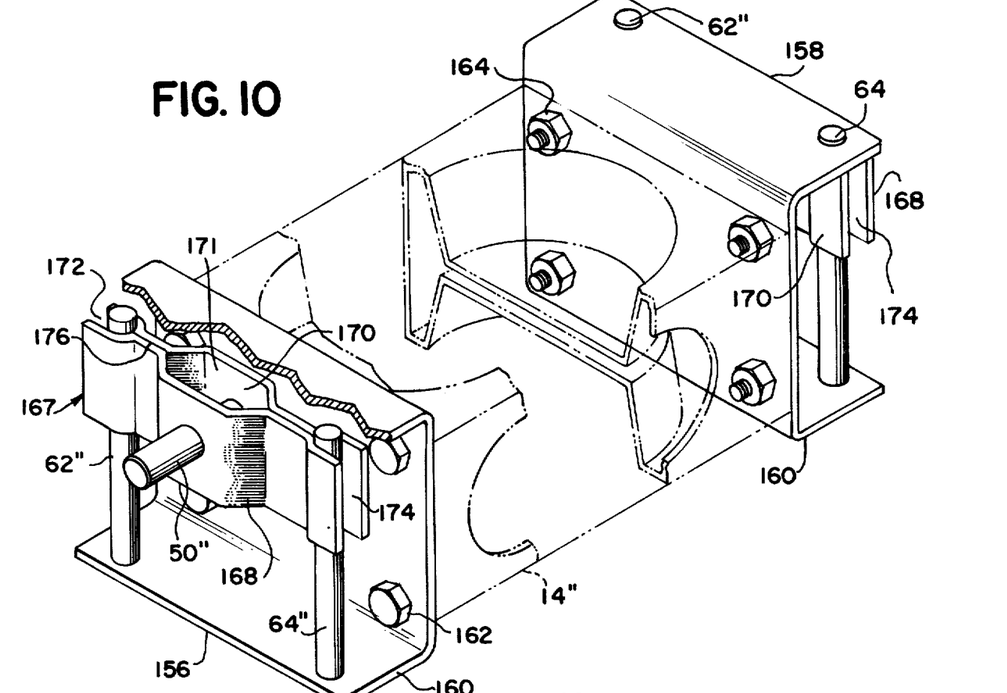
FIG. 10 is a perspective view of a modified baking pan showing a modified suspension construction.
Figure 11:
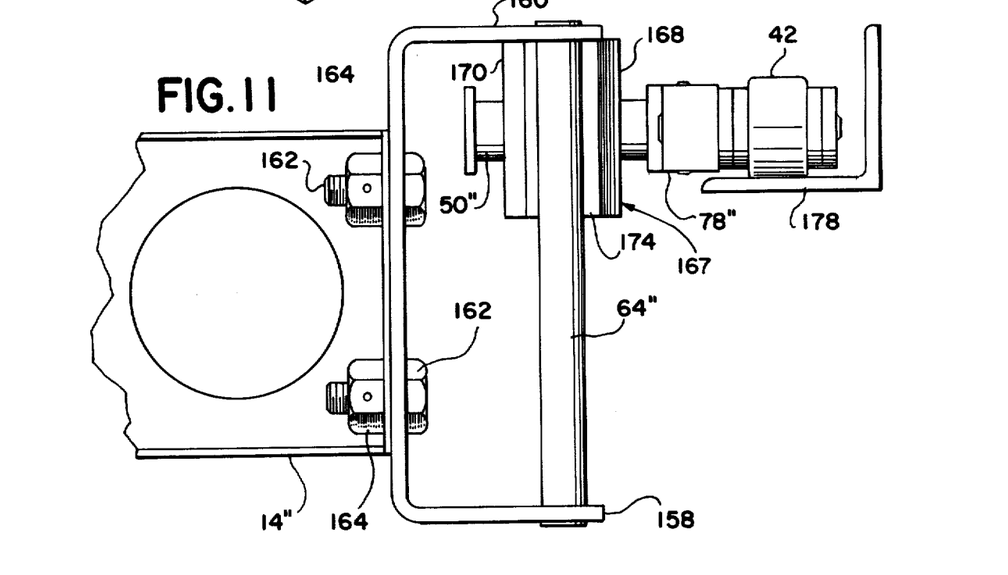
FIG. 11 is a partial, end elevational view of the baking tray of FIG. 10.

Referring now to FIGS. 10 and 11, there is illustrated another modified arrangement suitable for suspending the modified baking pans 14" from the chain conveyor 12. In this embodiment, a pair of transversely opposed pivot pins 50" are respectively carried by the baking tray 14" at the opposed ends for tray suspension purposes. Each lateral end of the modified baking pan 14" is equipped with a modified head 156,158 secured to the tray construction by conventional fasteners 162 and nuts 164. The heads 156,158 comprise a generally channel shaped body 160 which defines an interior chamber between the upper and lower flanges thereof. A slide 167 is vertically movable within the chamber for tray turnover purposes as hereinafter more fully set forth.

A pair of spaced, vertical guide rods 62', 64' are positioned within each chamber defined within the body 160 and the rods are secured to the upper and lower flanges thereof in a suitable manner well known to those skilled in the art. The slide 167 is fabricated of front and rear, similar bent metal halves 168, 170 which may be welded or otherwise secured at the areas of contact 176. The slide halves 168,170 are bent to provide a widened medial section 171 and respective open end sections 172, 174. The open end sections 172,174 are transversely spaced apart and are adapted to define grooves for vertical sliding engagement upon the guide rods 62", 64". Each widened area 171 carries a pivot pin 50" in stationary engagement to provide a substantially unitary construction wherein each pin 50" moves vertically relative to the baking tray 14" as the slide 167 itself moves vertically along the guide rods 62", 64".

Each pivot pin 50" is pivotally engaged within a chain attachment block 78" (FIG. 11) to permit full 360° rotation of the tray 14" relative to the chain conveyor 12. The chain attachment block 78" is affixed to the chain conveyor 12 at the interconnection of the chain links 44 and chain rollers 42 in the manner hereinbefore set forth. The chain rollers 42 may be supported upon suitable angle guides 178 to maintain horizontal positioning of the tray 14".

As the tray 14" is rotated through one hundred and eighty degrees, either by the rotary tray turnover 90 of FIG. 8 or the stationary tray turnover means 120 of FIG. 9, the slide 167 can vertically travel along the spaced guide rods 62", 64" for the full height of the body 160 during the tray turnover process. In this manner, the center of gravity of the tray 14" can be readily varied to aid in the tray turnover process.

It will be noted that in this embodiment, there is no force on the rods on which the stamping 171 slides and no eccentric load to contend with. When the pin moves, the weight of the tray is carried by the cams. The weight of the tray is not involved when the slide moves from one end of its path of travel to the other inasmuch as the cam carries the load.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a tray turnover mechanism for use in a conveyor system wherein a conveyor transports a plurality of trays which are suspended by gravity from pins carried by the conveyor, which trays comprise a top, a bottom and a pair of spaced heads, the combination of slot means provided in the heads of a tray to receive a pin therein in sliding engagement,
said tray being movable relative to the pin along the slot means;
cam means secured adjacent said conveyor system in position to turn over a tray as it is transported,
said cam means comprising a surface which is contacted by a portion of a tray,
said cam means being adapted to raise a tray while being transported by the conveyor system by moving the tray relative to the pin along the said slot means.

2. The tray turnover mechanism of claim 1 wherein the slot means extends in length a distance which is more than one-half the distance between the tray top and tray bottom.

3. The tray turnover mechanism of claim 2 wherein the slot means extends in length substantially the entire height of the tray.

4. The tray turnover mechanism of claim 1 wherein the tray is adapted both to rotate about the pin and to move vertically relative to the pin.

5. The tray turnover mechanism of claim 1 wherein the cam means comprise a circular cam and wherein portions of the tray bottom contact the periphery of the cam.

6. The tray turnover mechanism of claim 5 wherein the cam is secured by a shaft, said shaft being concentrically positioned.

7. The tray turnover mechanism of claim 6 wherein the cam is rotatable about the axis of the said shaft.

8. The tray turnover mechanism of claim 6 wherein the pins are turned through ninety degrees in a circular arc about the cam.

9. The tray turnover mechanism of claim 8 wherein the center of the circular arc is concentric with the shaft.

10. The tray turnover mechanism of claim 8 wherein the pins transcribe a circular arc about the shaft which is defined by radial distances between the center of the pin and the center of the shaft that are equal through ninety degrees.

11. The tray turnover mechanism of claim 6 wherein the initial contact between the tray and the cam occurs above an imaginary line drawn between the center of the pivot pin and the center of the shaft at time of contact.

12. The tray turnover mechanism of claim 11 wherein the tray is adapted to be rotated in a counterclockwise direction about the pin during the tray turnover operation.

13. The tray turnover mechanism of claim 6 wherein the cam is rotated by the shaft.

14. The tray turnover mechanism of claim 13 wherein the peripheral speed of the cam equals the linear speed of the conveyor when the surface is in contact with a portion of the tray.

15. The tray turnover mechanism of claim 7 wherein the peripheral speed of the cam equals the linear speed of the conveyor when the surface is in contact with a portion of the tray.

16. The tray turnover mechanism of claim 1 and a weight slidable within the tray between a position near the top to a position near the bottom, said weight being moved as the tray is moved by the cam.

17. The tray turnover mechanism of claim 16 wherein the pin is affixed to the weight.

18. The tray turnover mechanism of claim 17 wherein a portion of the pin projects outwardly from the head through the said means provided in the heads of a tray, said portion being engaged to the conveyor.

19. The tray turnover mechanism of claim 18 wherein the engagement is adapted to permit rotation of the pin relative to the conveyor.

20. The tray turnover mechanism of claim 1 wherein the cam means comprise a stationary ramp and wherein portions of the tray bottom contact the ramp.

21. The tray turnover mechanism of claim 20 wherein the ramp includes a cam surface, said cam surface being sloped downwardly in a direction opposite the direction of conveyor travel.

22. The tray turnover mechanism of claim 21 wherein the cam surface is contacted by a corner portion of the tray.

23. The tray turnover mechanism of claim 22 wherein an angle is defined between the cam surface and the tray bottom at time of initial contact.

24. The tray turnover mechanism of claim 23 wherein the angle is less than forty-five degrees.

25. The tray turnover mechanism of claim 21 wherein the cam surface length is sufficient to raise a tray through a height equal to the height of the slot means.

26. The tray turnover mechanism of claim 20 wherein the cam means comprise a turnover wheel, said wheel being rotative relative to the ramp.

27. The tray turnover mechanism of claim 26 wherein the turnover wheel is so positioned that a portion of its outer periphery is tangential to a planar extension of the ramp.

28. The tray turnover mechanism of claim 27 wherein the wheel is rotated by a power driven shaft.

29. The tray turnover mechanism of claim 27 wherein the wheel is rotated by each tray as the tray contacts the wheel periphery.

30. The tray turnover mechanism of claim 27 wherein the peripheral speed of the turnover wheel equals the linear speed of the conveyor when a tray is in contact with the wheel.

* * * * *